United States Patent
Kobayashi

(10) Patent No.: US 8,155,185 B2
(45) Date of Patent: Apr. 10, 2012

(54) IMAGE CODING APPARATUS AND METHOD

(75) Inventor: Satoru Kobayashi, Bunkyo-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1475 days.

(21) Appl. No.: 11/564,114

(22) Filed: Nov. 28, 2006

(65) Prior Publication Data

US 2007/0171973 A1 Jul. 26, 2007

(30) Foreign Application Priority Data

Dec. 5, 2005 (JP) ................................. 2005-351053

(51) Int. Cl.
*H04N 7/12* (2006.01)
*G06K 9/36* (2006.01)

(52) U.S. Cl. ................................... 375/240.12; 382/236

(58) Field of Classification Search ............. 375/240.12, 375/240.01, 240.25, 242; 386/68; 382/236
See application file for complete search history.

(56) References Cited

U.S. PATENT DOCUMENTS

| | | | |
|---|---|---|---|
| 7,346,216 B2 * | 3/2008 | Adachi et al. ................. | 382/236 |
| 7,903,737 B2 * | 3/2011 | Martinian et al. ......... | 375/240.12 |
| 2004/0028132 A1 | 2/2004 | Kadono et al. | |
| 2005/0265461 A1 * | 12/2005 | Raveendran .................. | 375/242 |
| 2006/0120463 A1 * | 6/2006 | Wang ........................ | 375/240.25 |
| 2006/0140271 A1 * | 6/2006 | Wedi et al. ................ | 375/240.12 |
| 2007/0071398 A1 * | 3/2007 | Raveendran et al. ........... | 386/68 |
| 2010/0034254 A1 * | 2/2010 | Wang ........................ | 375/240.01 |

FOREIGN PATENT DOCUMENTS

JP  2003-199112 A  7/2003

* cited by examiner

*Primary Examiner* — Gims Philippe

(74) *Attorney, Agent, or Firm* — Canon USA Inc IP Division

(57) ABSTRACT

An image coding apparatus includes a coding unit configured to set, when coding processing is performed on input image data, a first coding picture that is to be generated by intra-picture prediction coding within the first coding picture, skip reference beyond the first coding picture being inhibited, and set, when coding processing is performed on the input image data, a second coding picture that is to be generated by inter-picture prediction coding, and skip reference beyond the second coding picture being inhibited. The coding unit performs coding processing on the input image data such that at least one second coding picture is set proximate to the first coding picture.

35 Claims, 15 Drawing Sheets

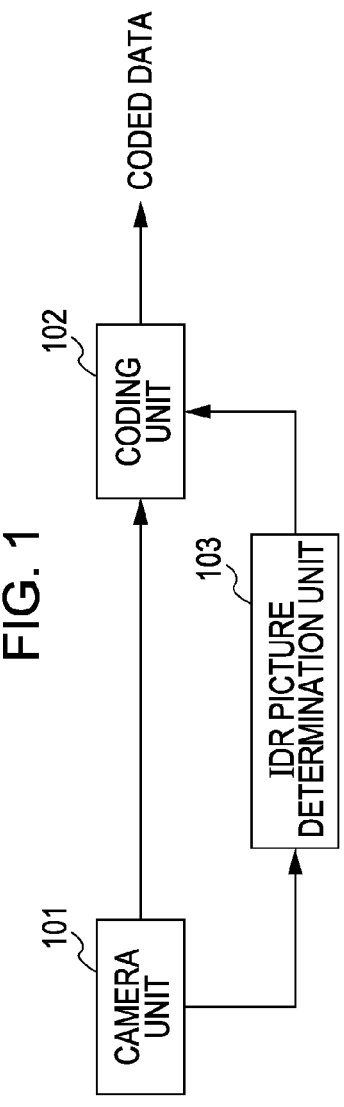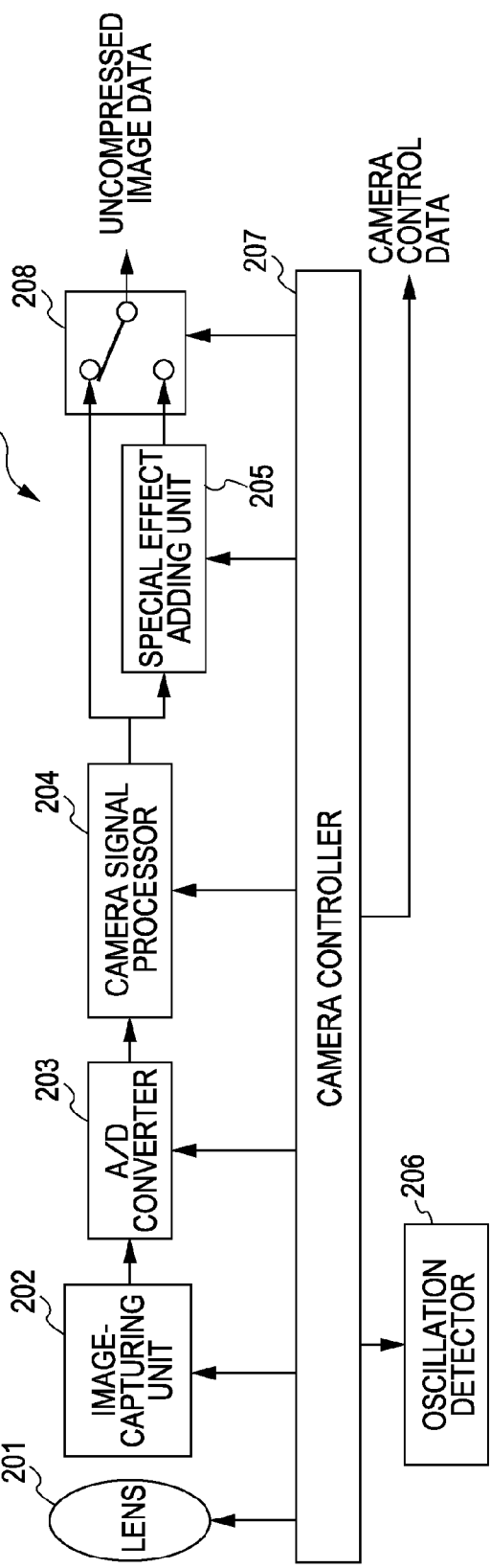

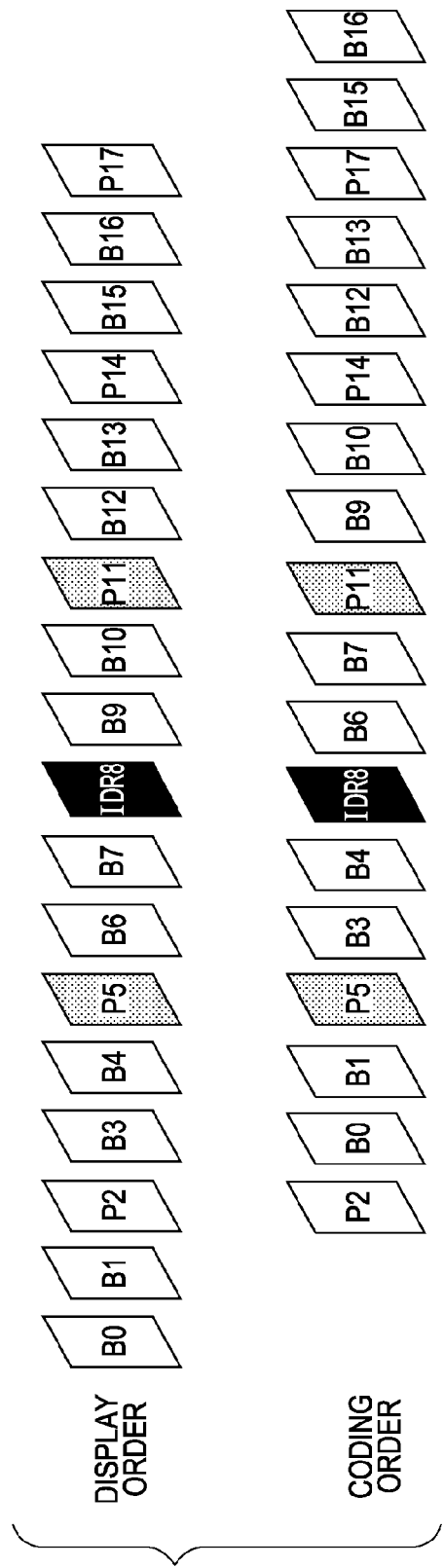

IMAGE CODING APPARATUS AND METHOD

BACKGROUND OF THE INVENTION

1. Field of the Invention

The present invention relates to an image coding apparatus and an image coding method that perform inter-prediction between pictures to compress and code input images.

2. Description of the Related Art

As technologies for coding images with high efficiency, coding methods, such as the Joint Photographic Experts Group (JPEG) method and the Moving Picture Experts Group (MPEG) 1 and 2 methods using motion prediction and motion compensation, have been established. Manufacturers have been developing and manufacturing image-capturing apparatuses, such as digital cameras and video cameras, and digital versatile disc (DVD) recorders that are capable of recording images using such coding methods. In addition to these apparatuses, users have been able to easily view recorded images using personal computers or DVD players.

The amount of data contained in digitized moving images is huge. Thus, moving image coding methods capable of achieving higher compression compared with the above-mentioned MPEG 1 or 2 have been studied. In recent years, a coding method called H.264/MPEG-4 part 10 (advanced video coding (AVC)) (hereinafter, referred to as an "H.264 coding method") has been standardized by the International Telecommunication Union-Telecommunication Standardization Sector (ITU-T) and the International Standardization Organization (ISO).

Selection of picture types and reference images used for inter-picture prediction in the H.264 coding method will be described with reference to FIGS. 21A to 21C and FIGS. 22A to 22B. FIGS. 21A to 21C and FIGS. 22A to 22B show input image streams and picture types.

Referring to FIGS. 21A to 21C and FIGS. 22A to 22B, the upper part of each figure represents a display order in which pictures are displayed from the left to right, and the lower part of each figure represents a coding order in which pictures are coded from the left to right. For example, a picture P8 in FIG. 21A represents the frame of a P picture that is displayed ninth. In addition, arrows in FIGS. 21A to 21C and FIGS. 22A to 22B represent a reference relationship. For example, in the example shown in FIG. 21A, the picture P8 refers to a picture B0. In the example shown in FIG. 21B, the picture B0 refers to a picture P2 and a picture B7.

As picture types of image frames in the H.264 coding method, I pictures that are coded using information within the same frame, P pictures that are coded using a difference from the temporally preceding frame, and B pictures that are coded using a difference from the temporally preceding frame or the temporally succeeding frame are provided.

In addition, in the H.264 coding method, any picture and any picture type within an image stream can be used as a reference image when inter-picture prediction is performed. For example, as shown in FIG. 21A, the picture P8 (P picture) is capable of referring to a picture beyond a picture I5, which is the I picture immediately before the picture P8. Similarly, as shown in FIG. 21B, the picture B0 (B picture) is capable of referring to a picture beyond the picture I5, which is the I picture immediately after the picture B0. As described above, the H.264 coding method permits flexible reference. Thus, compared with a case of the MPEG 2 method in which a P picture is only capable of referring to the I or P picture immediately before the P picture, the accuracy of inter-picture prediction and coding efficiency can be improved.

However, due to such flexible reference being allowed, rapid random access may not be achieved. As an example, a case shown in FIG. 21C in which playback is started from the picture I5 (I picture), which is in the middle of an image stream, by random access will be explained.

When playback is started from the picture I5 in the middle of the image stream and the picture P8 (P picture) is decoded, since the picture P8 refers to the picture B0 (B picture), it is necessary to decode the picture B0 in advance. In addition, since the picture B0 refers to the picture P2 (P picture) and the picture B7 (B picture), it is necessary to decode the pictures P2 and B7 in advance. Similarly, although not illustrated, since the pictures P2 and B7 refer to other pictures, it is also necessary to decode the corresponding pictures in advance. As described above, even in a case where playback is started from the picture I5, which is an I picture, since reference beyond the I picture can be permitted, it is necessary to start decoding from data before the picture I5. Thus, it is difficult to quickly start decoding from the picture I5.

Thus, in order to solve the above-mentioned problem and to achieve rapid random access, a method for regularly imposing a restriction on a motion reference relationship of an I picture is suggested, for example, in Japanese Patent Laid-Open No. 2003-199112. In the H.264 coding method, such a conditional I picture is referred to as an instantaneous decoder refresh (IDR) picture.

IDR pictures will be described with reference to FIGS. 22A and 22B. Image streams shown in FIGS. 22A and 22B are different from the image streams shown in FIGS. 21A and 21B in that the picture I5 is set as an IDR picture. When the picture I5 (I picture) is set as a picture IDR5 (IDR picture), a frame memory in which a reference image is recorded is cleared when the IDR picture is coded. Thus, a picture to be coded after the picture IDR5 cannot refer to a picture that is coded before the picture IDR5. Similarly, a picture coded before the picture IDR5 cannot refer to a picture to be coded after the picture IDR5.

In the example shown in FIG. 22A, P pictures and B pictures to be coded after the picture IDR5 (that is, the pictures P8, B6, and the like) cannot refer to P pictures and B pictures coded before the picture IDR5 (that is, the pictures P2, B0, and the like). Similarly, in the example shown in FIG. 22B, P pictures and B pictures coded before the picture IDR5 (that is, the pictures P2, B0, and the like) cannot refer to P pictures and B pictures to be coded after the picture IDR5 (that is, the pictures P8, B6, and the like).

That is, since the reference relationship is reset by an IDR picture, when playback is started from the IDR picture, it is not necessary to decode a picture before the IDR picture. Thus, random access can be easily performed.

As described above, in the H.264 coding method, random access can be performed easily by utilizing an IDR picture that restricts the reference relationship in inter-picture prediction. Thus, in order to achieve random access to a desired position of an image stream, it is necessary to set many IDR pictures. However, since the amount of generated code for an IDR picture to be coded using information within the picture is large, setting a large number of pictures as IDR pictures may deteriorate coding efficiency. In addition, if many IDR pictures are used, the originally provided flexible reference relationship in the H.264 coding method may be restricted. Thus, the efficiency of inter-picture coding may also be deteriorated.

Thus, it is desirable to set a minimum number of IDR pictures. When an IDR picture is regularly set, as in the known technology, even a picture that is not necessary for random access is set as an IDR picture. Thus, coding efficiency is deteriorated.

SUMMARY OF THE INVENTION

The present invention provides an image coding apparatus and an image coding method that generate an image stream in which random access to the middle of the image stream can be achieved without deteriorating coding efficiency. In addition, the present invention improves the arbitrariness in random access to a target scene of an image stream.

According to an aspect of the present invention, an image coding apparatus is provided that compresses and codes image data. The image coding apparatus includes a coding unit that is configured to set, when coding processing is performed on input image data, a first coding picture that is to be generated by intra-picture prediction coding within the first coding picture, skip reference beyond the first coding picture being inhibited, and set, when coding processing is performed on the input image data, a second coding picture that is to be generated by inter-picture prediction coding, and skip reference beyond the second coding picture being inhibited. The coding unit sets at least one second coding picture proximate to the first coding picture.

In addition, according to another aspect of the present invention, an image coding method is provided for compressing and coding image data. The method includes a coding step of setting, when coding processing is performed on input image data, a first coding picture that is to be generated by intra-picture prediction coding within the first coding picture, skip reference beyond the first coding picture being inhibited, and setting, when coding processing is performed on the input image data, a second coding picture that is to be generated by inter-picture prediction coding, and skip reference beyond the second coding picture being inhibited. In the coding step, at least one second coding picture is set proximate to the first coding picture.

According to yet another aspect of the present invention, a computer readable medium is provided which contains computer-executable instructions for compressing and coding image data. Here, the computer readable medium includes computer-executable instructions for performing a coding step of setting, when coding processing is performed on input image data, a first coding picture that is to be generated by intra-picture prediction coding within the first coding picture, skip reference beyond the first coding picture being inhibited, and setting, when coding processing is performed on the input image data, a second coding picture that is to be generated by inter-picture prediction coding, and skip reference beyond the second coding picture being inhibited, wherein, in the coding step, at least one second coding picture is set proximate to the first coding picture.

Further features and aspects of the present invention will become apparent from the following description of exemplary embodiments with reference to the attached drawings.

BRIEF DESCRIPTION OF THE DRAWINGS

FIG. 1 is a block diagram showing an exemplary configuration of an image coding apparatus according to an aspect of the present invention.

FIG. 2 is a block diagram showing an exemplary configuration of a camera unit according to an aspect of the present invention.

FIG. 23 shows an example in which P pictures before and after an IDR picture are set as conditional P pictures on which a motion reference relationship is restricted.

DESCRIPTION OF THE EMBODIMENTS

Figure 3:
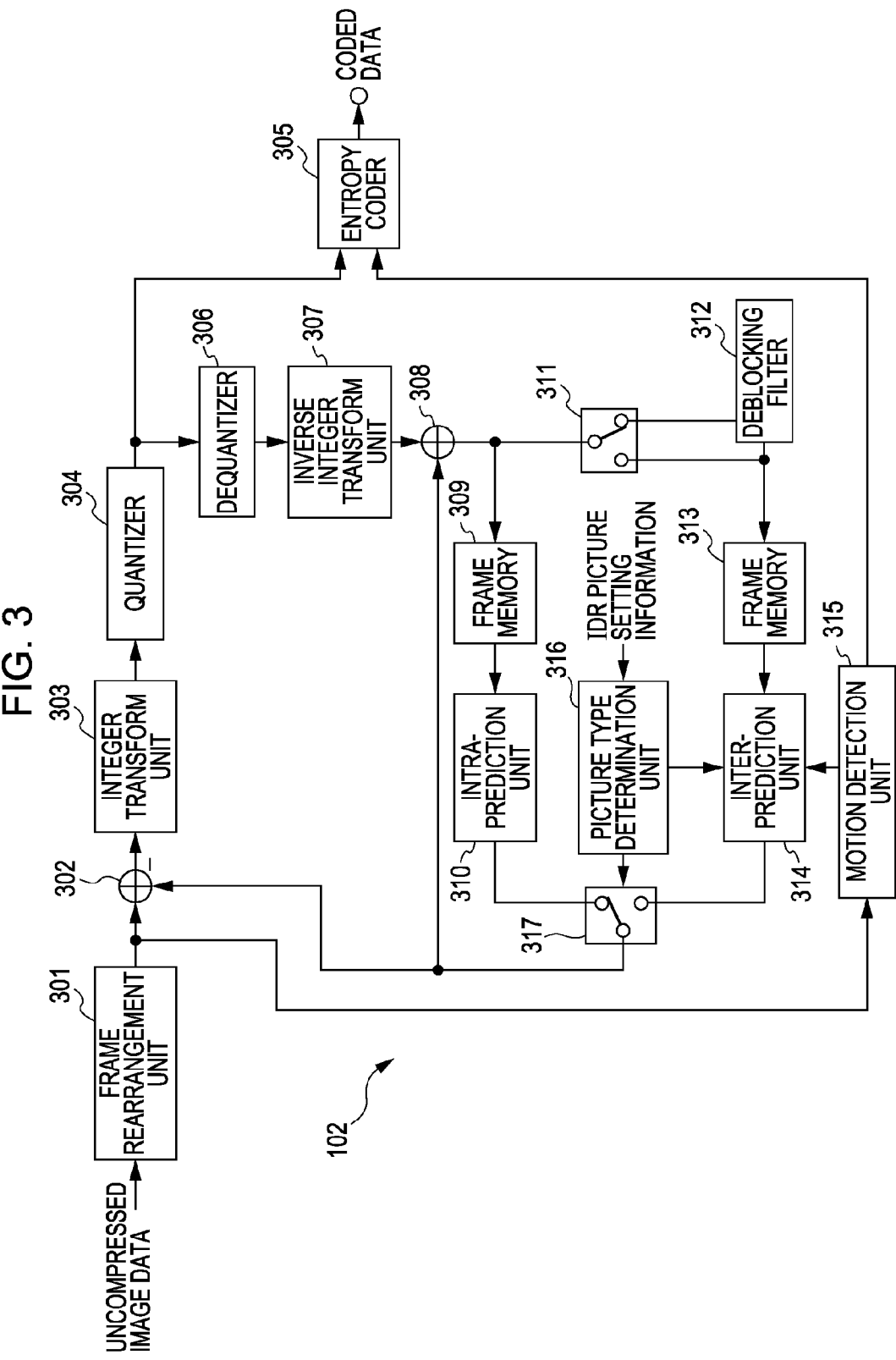
FIG. 3 is a block diagram showing an exemplary configuration of a coding unit according to an aspect of the present invention.

Numerous embodiments, features and aspects of the present invention will be described with reference to the drawings.

First Exemplary Embodiment

A first exemplary embodiment of the present invention will now herein be described. FIG. 1 is a block diagram showing the configuration of an image coding apparatus according to the first embodiment of the present invention. Such an image coding apparatus is applicable to a digital camera, a digital video camera (camcorder), or a captured image coding system that is configured by connecting a camera to a coding apparatus (a personal computer or the like).

The image coding apparatus according to the first embodiment sets an IDR picture at a scene to which a higher attention is paid by a viewer in accordance with camera control data, and sets a conditional P picture on which a motion reference relationship is restricted (hereinafter, also referred to as a conditional P picture) that enables random access in conjunction with the setting of the IDR picture. The conditional P picture on which the motion reference relationship is restricted will be explained later.

Referring to FIG. 1, a camera unit 101 captures an image. A coding unit 102 compresses and codes uncompressed image data received from the camera unit 101. An IDR picture determination unit 103 acquires camera control data from the camera unit 101, and determines whether or not to set a picture type as an IDR picture in accordance with the camera control data. Next, the camera unit 101, the coding unit 102, and the IDR picture determination unit 103 will be described in more detail.

FIG. 2 is a block diagram showing an exemplary configuration of the camera unit 101. The camera unit 101 receives subject light, and outputs uncompressed image data and camera control data.

A lens 201 guides the subject light to an image-capturing unit 202. In accordance with a control signal output from a camera controller 207, which will be described later, the lens 201 performs a zooming operation, focus adjustment, and the like. The image-capturing unit 202 captures an image of a subject using an image sensor, such as a charge-coupled device (CCD) or a complementary metal-oxide semiconductor (CMOS), and converts the acquired subject light into an electric signal. An analog-to-digital (A/D) converter 203 converts an analog signal into a digital signal.

A camera signal processor 204 performs γ correction, white balance control, and the like on the digital signal output from the A/D converter 203, and outputs uncompressed image data. When special effects, such as fading or wiping, are added to the uncompressed image data, a special effect adding unit 205 adds special effects to the uncompressed image data and outputs the uncompressed image data including the special effects added thereto. In contrast, when special effects are not added, the uncompressed image data is output without being subjected to any processing.

A switch 208 selects whether to output the uncompressed image data including special effects added thereto acquired by adding special effects to the uncompressed image data output from the camera signal processor 204 or the uncompressed image data output from the camera signal processor 204 without being subjected to any processing. That is, the switch 208 selects whether or not to add special effects. An oscillation detector 206 detects hand shaking (that is, blurring of images due to hand movement) or panning/tilting of the camera unit 101 by detecting oscillation of the camera unit 101 in accordance with a well-known method using a gyro or the like.

The camera controller 207 controls the operation of each portion of the camera unit 101, and outputs camera control data. The camera control data includes control data for each module constituting the camera unit 101. Hand shaking or panning/tilting may be detected by a method in which the camera signal processor 204 measures the difference between a particular frame and the frame immediately before the particular frame.

FIG. 3 is a block diagram showing an exemplary configuration of the coding unit 102. The coding unit 102 forms a plurality of blocks by dividing received uncompressed image data. The coding unit 102 performs coding processing for each block, and outputs coded data.

A frame rearrangement unit 301 receives uncompressed image data in a display order, and rearranges the received uncompressed image data into a coding order. A subtracter 302 subtracts prediction image data from the input image data, and outputs image residual data. Generation of prediction image data will be described later.

An integer transform unit 303 performs orthogonal transformation of the image residual data output from the subtracter 302, and outputs a transformation coefficient. A quantizer 304 quantizes the transformation coefficient using a predetermined quantization parameter. An entropy coder 305 receives the transformation coefficient quantized by the quantizer 304 and motion vector information. The entropy coder 305 entropy-codes the received transformation coefficient and motion vector information, and outputs the entropy-coded transformation coefficient and motion vector information as coded data.

The transformation coefficient quantized by the quantizer 304 is also used for generation of prediction image data. A dequantizer 306 dequantizes the transformation coefficient quantized by the quantizer 304. In addition, an inverse integer transform unit 307 performs inverse integer transformation on the transformation coefficient dequantized by the dequantizer 306, and outputs the transformation coefficient subjected to inverse integer transformation as decoded image residual data. An adder 308 adds the decoded image residual data to the prediction image data, and outputs the combined data as reconfigured image data.

The reconfigured image data output from the adder 308 is recorded in a frame memory 309. At the same time, if deblocking filtering is to be performed on the reconfigured image data, the reconfigured image data is recorded in a frame memory 313 via a deblocking filter 312. In contrast, if deblocking filtering is not to be performed on the reconfigured image data, the reconfigured image data is recorded in the frame memory 313 without being subjected to processing of the deblocking filter 312.

A switch 311 serves as a selector that selects whether or not to perform deblocking filtering on the reconfigured image data output from the adder 308. Data from among the reconfigured image data that may be referred to in the subsequent prediction processing is stored in the frame memory 309 or 313 for a certain period.

An intra-prediction unit 310 performs intra-picture prediction using the reconfigured image data recorded in the frame memory 309 to generate prediction image data. An inter-prediction unit 314 performs inter-picture prediction using the reconfigured image data recorded in the frame memory 313 in accordance with motion vector information detected by a motion detection unit 315 to generate prediction image data. The motion detection unit 315 detects a motion vector in input image data, and outputs the detected motion vector information to the inter-prediction unit 314 and to the entropy coder 305.

When a picture to be coded is determined to be an IDR picture in accordance with IDR picture setting information received from the IDR picture determination unit 103, a picture type determination unit 316 determines the picture type of the corresponding picture to be an IDR picture. In contrast, if a picture to be coded is determined not to be an IDR picture, the picture type determination unit 316 determines a picture type in keeping with the H.264 coding method. A switch 317 is a selector that selects whether to use intra-prediction or inter-prediction. The switch 317 selects one of the output from the intra-prediction unit 310 and the output from the inter-prediction unit 314 in accordance with the picture type determined by the picture type determination unit 316, and outputs the selected prediction image data to the subtracter 302 and to the adder 308.

In addition, if a picture to be coded is determined to be an IDR picture, the picture type determination unit 316 may determine the picture type of the corresponding picture to be an I picture and may add a skip reference inhibit flag to the corresponding picture. Thus, the inter-prediction unit 314 determines a reference relationship in which skipping of the I picture should not be performed.

Figure 4:
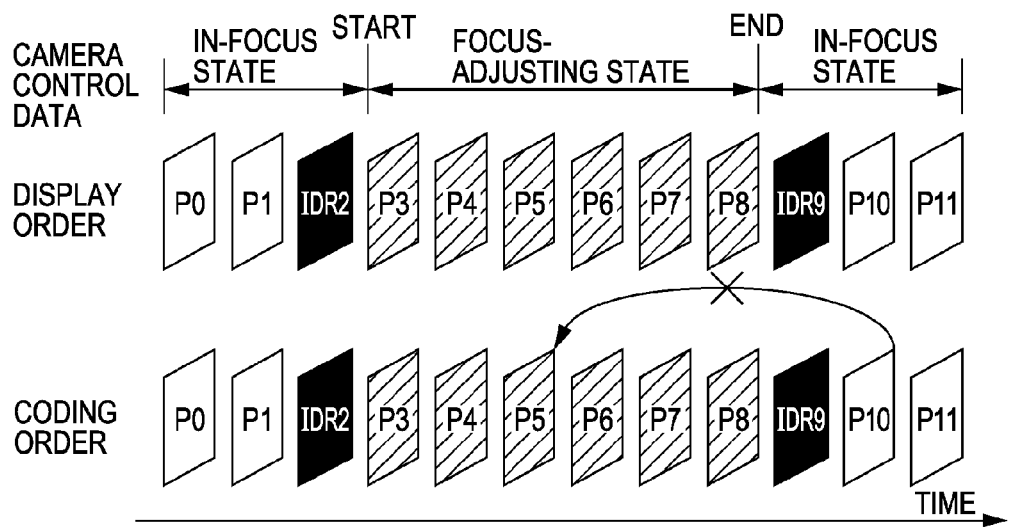
FIG. 4 is an illustration for explaining an exemplary setting of an IDR picture in an image stream not including a B picture in accordance with focus adjustment control data according to an aspect of the present invention.
Figure 5:
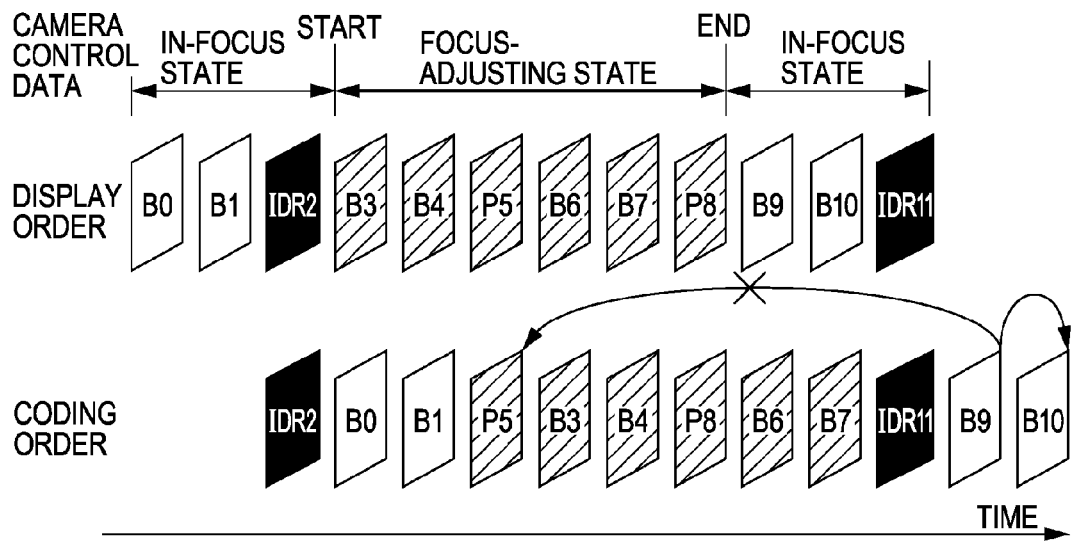
FIG. 5 is an illustration for explaining exemplary setting of an IDR picture in an image stream including a B picture in accordance with focus adjustment control data according to an aspect of the present invention.

The IDR picture determination unit 103 will be described with reference to FIGS. 4 to 9 which show input image streams, picture types, and camera control data. Referring to FIGS. 4 to 9, the upper part of each figure represents a display order in which pictures are displayed from the left to right, and the lower part of each figure represents a coding order in which pictures are coded from the left to right. As a picture type, "P" represents a P picture, "B" represents a B picture, and "IDR" represents an IDR picture. For example, in FIG. 4, a picture P10 represents the frame image of a P picture that is displayed eleventh. Camera control data shown in FIGS. 4 and 5 represents focus adjustment control data.

In the example shown in FIG. 4, during the period from pictures P0 to IDR2 and the period from pictures IDR9 to P11, an in-focus state is achieved, and the camera unit 101 outputs in-focus images. In addition, the camera unit 101 starts focus adjustment at a picture P3, and ends the focus adjustment at a picture P8. Thus, during the period from the pictures P3 to P8, a focus-adjusting state is achieved, and the camera unit 101 outputs out-of-focus images. In the example shown in FIG. 5, during the period from pictures B0 to IDR2 and the period from pictures B9 to IDR11, an in-focus state is achieved, and the camera unit 101 outputs in-focus images. In addition, the camera unit 101 starts focus adjustment at a picture B3, and ends the focus adjustment at a picture P8. Thus, during the period from the pictures B3 to P8, a focus-adjusting state is achieved, and the camera unit 101 outputs out-of-focus images.

The IDR picture determination unit 103 receives camera control data output from the camera unit 101, and analyzes the operation of the camera unit 101. The IDR picture determination unit 103 determines the picture type of the frame before or after any of operations (1) focus adjustment, (2) zooming, (3) panning/tilting, (4) hand shaking, and (5) special effect addition as an IDR picture. Alternatively, the IDR picture determination unit 103 determines the picture types of the frames before and after any of the operations (1) to (5) as IDR pictures. Then, the IDR picture determination unit 103 outputs IDR picture setting information to the coding unit 102.

An exemplary operation for determining a picture type to be an IDR picture in accordance with camera control data will be described with reference to FIGS. 4 and 5 by way of example of the case of (1) focus adjustment.

In the example of the image stream shown in FIG. 4 not including a B picture, the camera unit 101 performs focus adjustment during the period from the pictures P3 to P8. Thus, the IDR picture determination unit 103 determines the picture type of each of the frames immediately before and after the processing operation to be an IDR picture, and sets a picture IDR2 and a picture IDR9.

In the example of the image stream shown in FIG. 5 including a B picture, the camera unit 101 performs focus adjustment during the period from the pictures B3 to P8. Thus, the IDR picture determination unit 103 determines the picture type of the frame immediately before the picture B0 in terms of the coding order and the picture type of the frame immediately after the picture B7 in terms of the coding order to be IDR pictures, such that the processing operation period is sandwiched between the IDR pictures. Accordingly, the IDR picture determination unit 103 sets a picture IDR2 and a picture IDR11.

As described above, when IDR pictures are set as in the examples shown in FIGS. 4 and 5, for example, random access to a focused IDR picture (the picture IDR9 shown in FIG. 4 or the picture IDR11 shown in FIG. 5) can be performed. In addition, since frames before and after a blurred image stream in the process of focus adjustment are set as IDR pictures, blurred images can be cut easily. Even if focused images (for example, a picture P10 shown in FIG. 4 and a picture B9 shown in FIG. 5) refer to out-of-focused images (for example, pictures P5 shown in FIGS. 4 and 5), since reference images are blurred, the accuracy of inter-frame prediction is reduced. By setting frames before and after focus adjustment as IDR pictures, focused images (for example, the picture P10 shown in FIG. 4 and the picture B9 shown in FIG. 5) are inhibited to refer to out-of-focused images (for example, the pictures P5 shown in FIGS. 4 and 5). Thus, only focused images are to be referred to, and the accuracy of inter-frame prediction can be improved.

Figure 6:
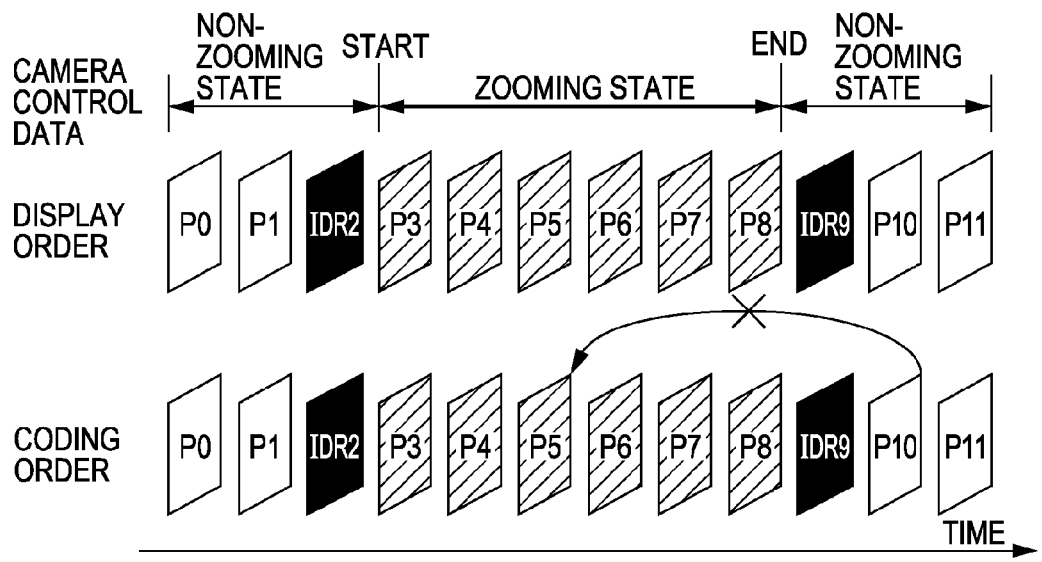
FIG. 6 is an illustration for explaining an exemplary setting of an IDR picture in an image stream not including a B picture in accordance with zooming operation control data according to an aspect of the present invention.

In the case of (2) zooming, as shown in FIG. 6, the picture type of each of the frames before and after a zooming operation is set as an IDR picture, as in the case of (1) focus adjustment.

Figure 7:
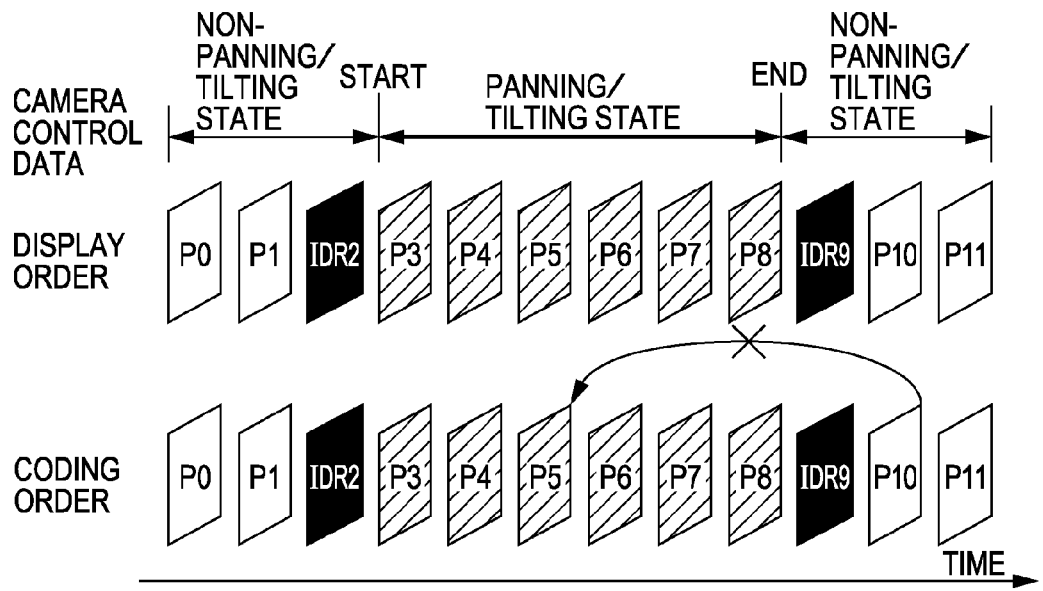
FIG. 7 is an illustration for explaining an exemplary setting of an IDR picture in an image stream not including a B picture in accordance with panning/tilting detection data according to an aspect of the present invention.

In the case of (3) panning/tilting, as shown in FIG. 7, the picture type of each of the frames before and after panning/tilting is set as an IDR picture.

Figure 8:
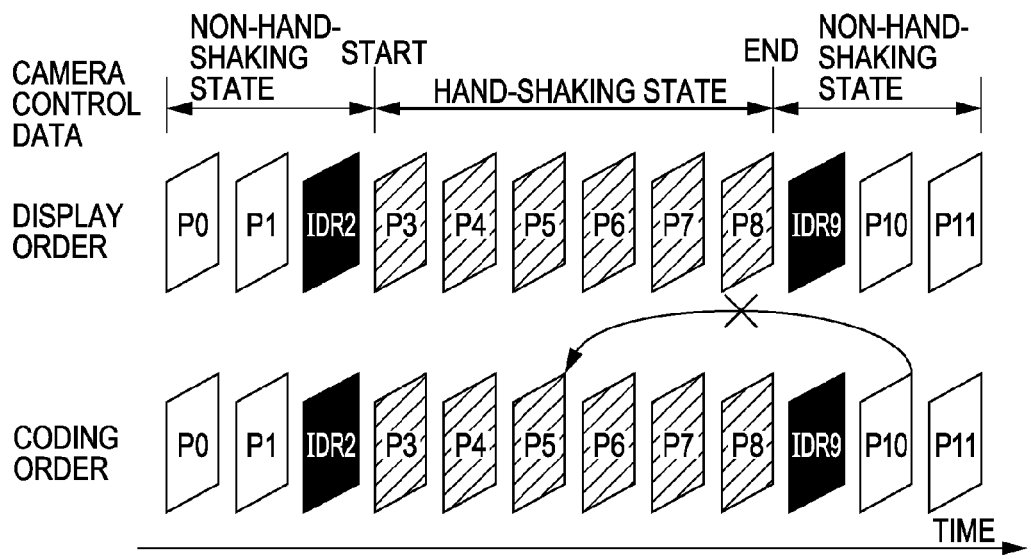
FIG. 8 is an illustration for explaining an exemplary IDR picture in an image stream not including a B picture in accordance with hand shaking detection data according to an aspect of the present invention.

In the case of (4) hand shaking, as shown in FIG. 8, the picture type of each of the frames before and after hand shaking is set as an IDR picture.

Figure 9:
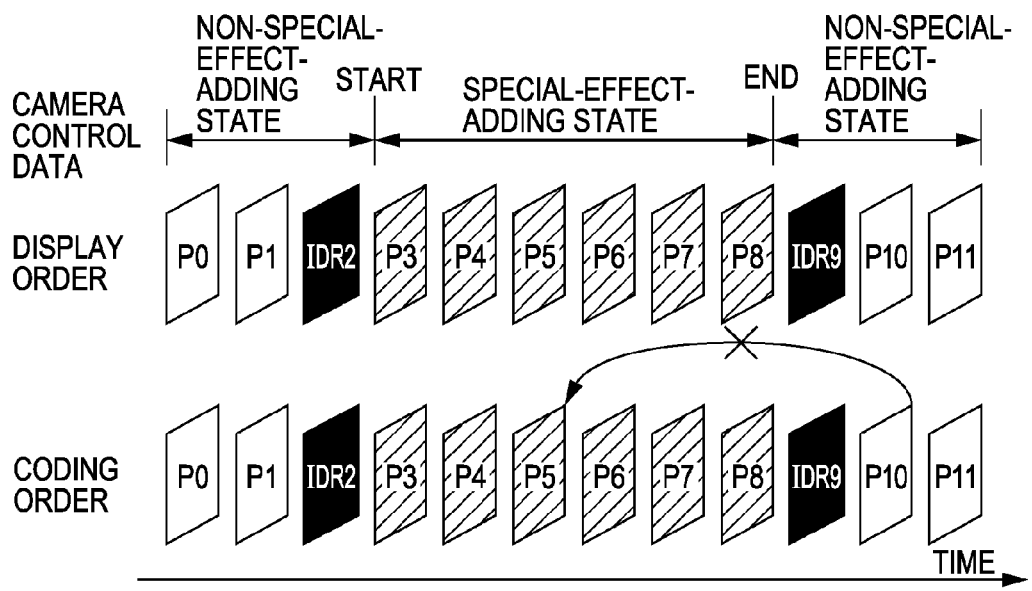
FIG. 9 is an illustration for explaining an exemplary setting of an IDR picture in an image stream not including a B picture in accordance with special effect addition control data according to an aspect of the present invention.

In the case of (5) special effect addition, as shown in FIG. 9, the picture type of each of the frames before and after special effect addition is set as an IDR picture.

Figure 10:
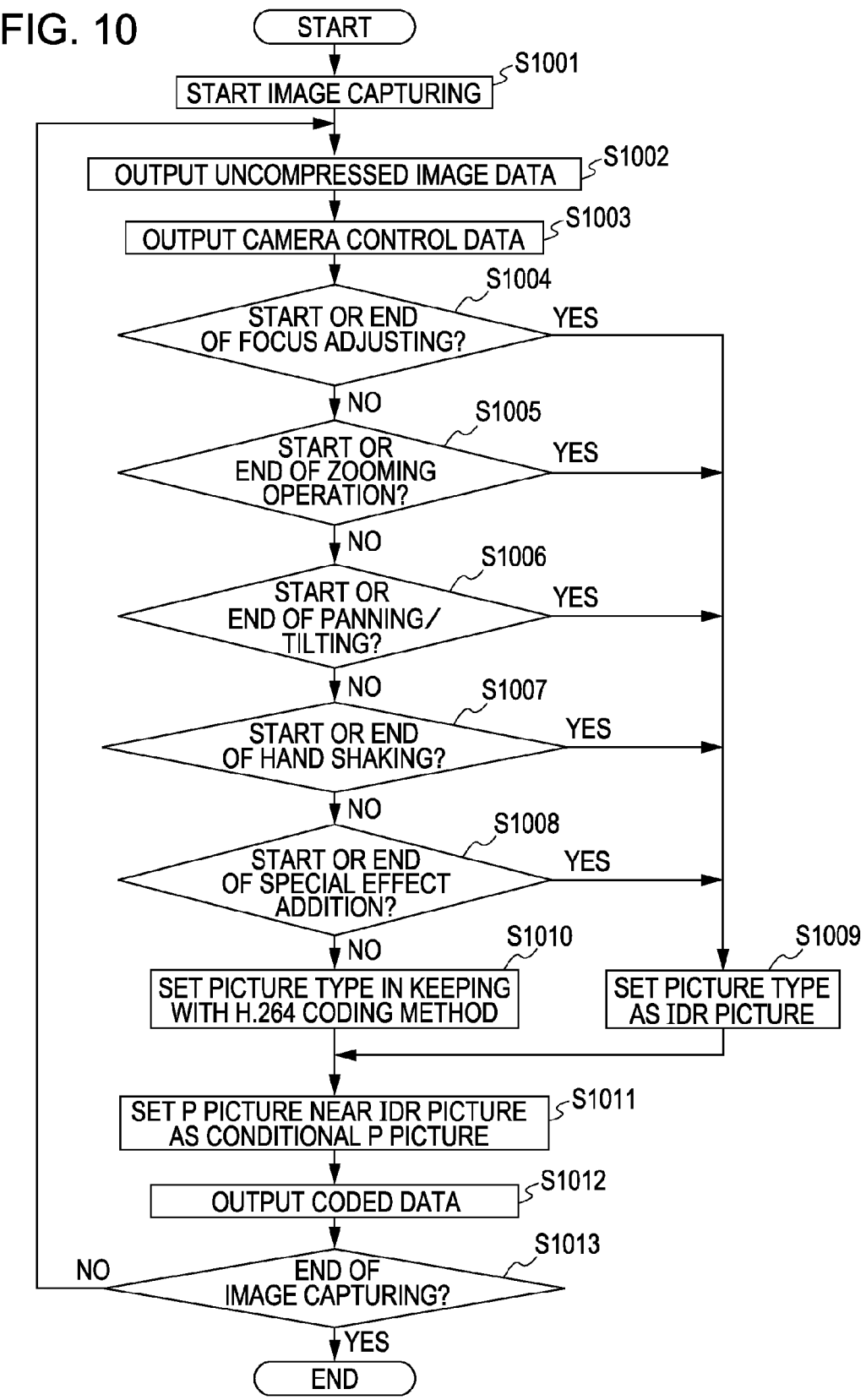
FIG. 10 is a flowchart of an exemplary coding process according to an aspect of the present invention.

Coding processing performed when an IDR picture is set in accordance with camera control data, as described above, will be described with reference to FIGS. 1 and 10. FIG. 10 is a flowchart of a coding process according to the first embodiment.

In step S1001, an image capturing starts. In step S1002, the camera unit 101 outputs uncompressed image data to the coding unit 102. In step S1003, the camera unit 101 outputs camera control data to the IDR picture determination unit 103. If the camera control data output in step S1003 indicates start or end of a focus adjusting operation, the IDR picture determination unit 103 outputs IDR picture setting information to the coding unit 102 in step S1004.

If the camera control data output in step S1003 does not indicate start or end of a focus adjusting operation but indicates start or end of a zooming operation (NO in step S1004), the IDR picture determination unit 103 outputs IDR picture setting information to the coding unit 102 in step S1005. Otherwise, the flow proceeds to step S1009.

If the camera control data output in step S1003 does not indicate start or end of a zooming operation but indicates start or end of panning/tilting (NO in step S1005), the IDR picture determination unit 103 outputs IDR picture setting information to the coding unit 102 in step S1006. Otherwise, the flow proceeds to step S1009.

If the camera control data output in step S1003 does not indicate start or end of panning/tilting but indicates start or end of hand shaking (NO in step S1006), the IDR picture determination unit 103 outputs IDR picture setting information to the coding unit 102 in step S1007. Otherwise, the flow proceeds to step S1009.

If the camera control data output in step S1003 does not indicate start or end of hand shaking but indicates start or end of special effect addition (NO in step S1007), the IDR picture determination unit 103 outputs IDR picture setting information to the coding unit 102 in step S1008. Otherwise, the flow proceeds to step S1009.

If IDR picture setting information is output from the IDR picture determination unit 103 in step S1004, S1005, S1006, S1007, or S1008 (YES in steps S1004-S1008), the picture type determination unit 316 of the coding unit 102 sets a picture type as an IDR picture in step S1009.

If IDR picture setting information is not output from the IDR picture determination unit 103 in step S1004, S1005, S1006, S1007, or S1008, the picture type determination unit 316 of the coding unit 102 sets a picture type in keeping with the H.264 coding method in step S1010.

Then next, in accordance with the picture type set in step S1009 or S1010, the coding unit 102 performs coding processing using inter-prediction or intra-prediction. In step S1011, a P picture proximate to the set IDR picture is set as a conditional P picture on which a reference relationship is restricted. Then, in step S1012, coded data is output. Such a series of processing is repeated for each picture until image capturing ends in step S1013. Thus, all the input image data is coded.

Next, an exemplary method for setting a conditional P picture in conjunction with an IDR picture set in accordance with the above-described method, which is a feature of the first embodiment, will be described.

A conditional P picture on which the motion reference relationship is restricted will be described first. A "conditional P picture on which the motion reference relationship is restricted" is a conditional P picture for which restriction is imposed on the motion reference relationship. That is, a conditional P picture is a picture in which rapid random access playback from the conditional P picture can be performed by decoding at least one reference picture that has a reference relationship with respect to the conditional P picture.

Figure 11:
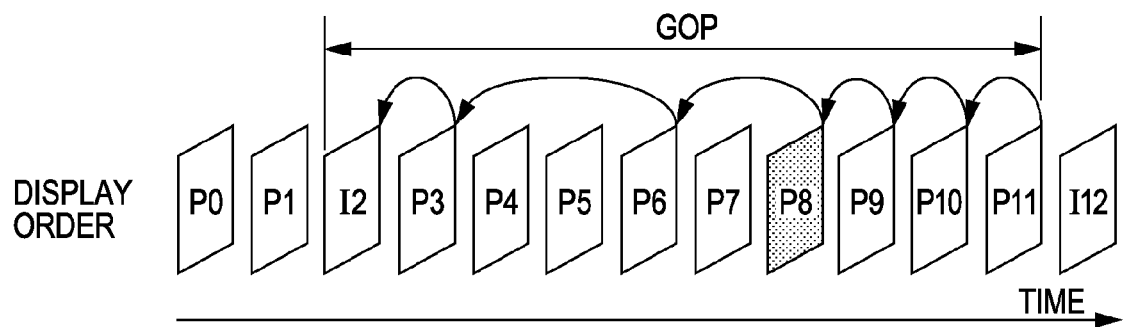
FIG. 11 is an illustration for explaining an exemplary conditional P picture on which a motion reference relationship is restricted according to an aspect of the present invention.

A conditional P picture will now be described with reference to an example shown in FIG. 11. Referring to FIG. 11, a picture P8 is a conditional P picture on which the motion reference relationship is restricted, and the other P pictures are normal P pictures. For the sake of easier explanation, an image stream including I pictures and P pictures will be described. However, even for an image stream including I pictures, P pictures, and B pictures, random access to a conditional P picture can be achieved by a similar method.

When random access to a P picture is performed, flexible inter-frame reference is permitted in the H.264 coding method, as described above. Since reference in which an I picture is skipped can be performed, random access may not be performed quickly. Thus, for example, rapid random access to a P picture can be achieved by imposing two restrictions (1) and (2) on the motion reference relationship:

(1) a picture having a reference relationship with respect to a conditional P picture on which the motion reference relationship is restricted refers to only an I or P picture located within the same group of pictures (GOP) (restriction 1);

(2) motion reference in which a conditional P picture on which the motion reference relationship is restricted is skipped is inhibited.

Restriction (1) will be explained with reference to FIG. 11. The picture P8 can only refer to an I or P picture located within the same GOP. For example, the picture P8 cannot refer to a picture P0. Under this restriction, in the example shown in FIG. 11, the picture P8 refers to a picture P6 located within the same GOP. The picture P6 can only refer to an I or P picture located within the same GOP. In the example shown in FIG. 11, the picture P6 refers to a picture P3 within the same GOP. In addition, the reference relationship of the picture P3 is similarly restricted. In the example shown in FIG. 11, the picture P3 refers to a picture I2 located within the same GOP. Thus, only by decoding the pictures I2, P3, and P6 in advance, the picture P8 can be decoded.

Still further, restriction (2) will be explained with reference to FIG. 11. Pictures after the picture P8 (that is, pictures P9 to P11) are restricted such that reference in which the picture P8 is skipped is inhibited. For example, each of the pictures P9, P10, and P11 cannot refer to a picture P5. Under this restriction, in the example shown in FIG. 11, the picture P11 refers to the picture P10, the picture P10 refers to the picture P9, and the picture P9 refers to the picture P8. Thus, when playback from the picture P8 is performed, pictures after the picture P8 can be sequentially decoded in accordance with motion compensation using reconfigured images stored in a frame memory and acquired by decoding. Thus, rapid decoding can be achieved.

Under such restrictions, decoding of the conditional P picture P8 can be achieved by decoding only the three pictures, the pictures I2, P3, and P6, which each have a reference relationship with respect to the conditional picture P8, in advance. In addition, pictures after the conditional P picture P8 can be sequentially decoded by performing motion compensation using reconfigured images acquired by decoding the pictures after the conditional P picture P8. Thus, rapid random access to a conditional P picture can be achieved.

Figure 12:
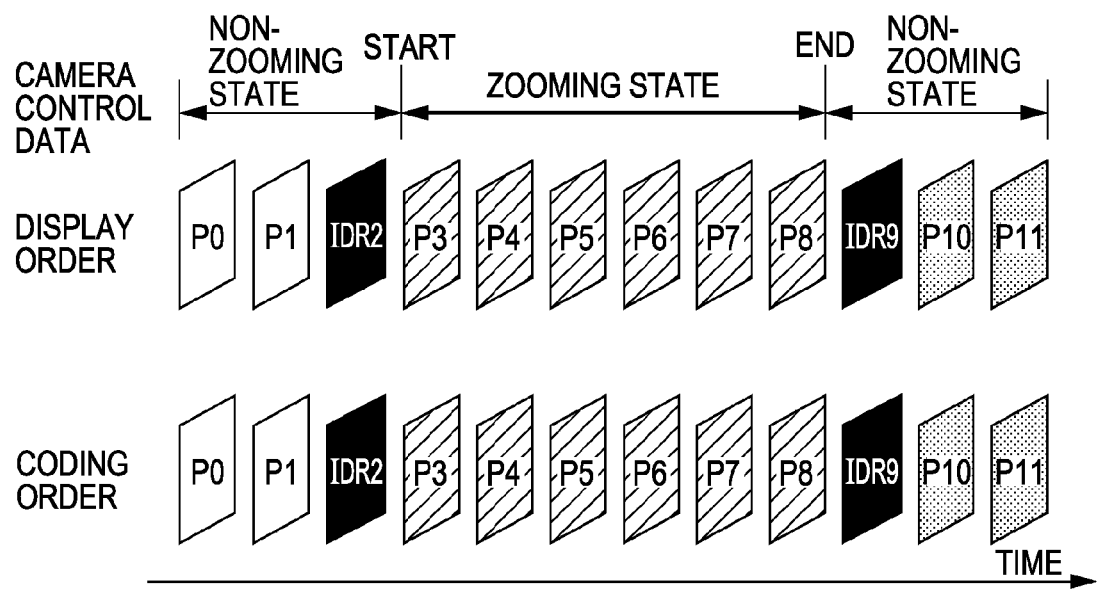
FIG. 12 is an illustration for explaining an exemplary method for setting a conditional P picture on which the motion reference relationship is restricted in accordance with zooming operation control data according to an aspect of the present invention.

An exemplary method for setting a conditional P picture proximate to an IDR picture in conjunction with setting of the IDR picture will be described with reference to FIG. 12. FIG. 12 shows an example in which a conditional P picture is set in conjunction with an IDR picture set in accordance with camera control data, which is the above-mentioned zooming information. Since photographers perform zooming toward a subject, a high attention is paid to an image after completing the zooming operation. Since photographers desire random access to a portion of an image stream to which a higher attention is paid, it is desirable to provide many random access points in the portion of the image stream to which the higher attention is paid.

Thus, at least one of the P pictures after an IDR picture (the picture IDR9) set immediately after the completion of the zooming operation in accordance with the above-described method is set as a conditional P picture in order to add a random access point. In the example shown in FIG. 12, the pictures P10 and P11 are set as conditional P pictures. That is, when the IDR picture determination unit 103 determines an IDR picture, the picture type determination unit 316 first sets a picture as an IDR picture. Then, the picture type determination unit 316 sets at least one of the pictures after the set IDR picture as a conditional P picture. Thus, in the scene immediately after the completion of the zooming operation, a plurality of random access points including the IDR picture and the conditional P picture are set.

Figure 13:
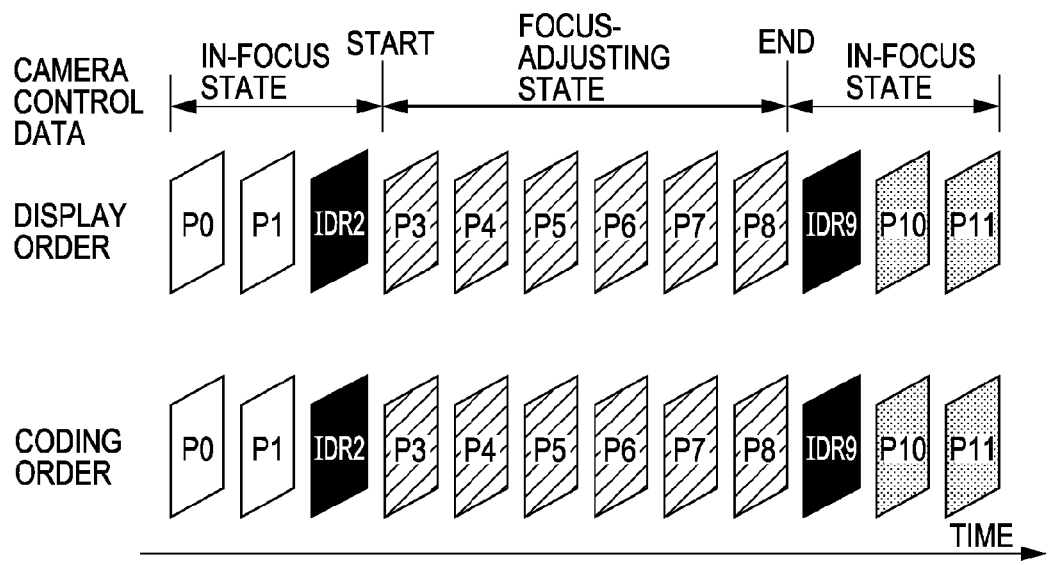
FIG. 13 is an illustration for explaining an exemplary method for setting a conditional P picture on which the motion reference relationship is restricted in accordance with focus adjustment control data according to an aspect of the present invention.

As in the case where zooming operation control data is selected as the above-described camera control data, in the case of selection of focus adjustment control data, a conditional P picture is set in conjunction with an IDR picture (the picture IDR9) set immediately after focus adjustment, as shown in FIG. 13. In the example shown in FIG. 13, the pictures P10 and P11 are set as conditional P pictures. That is, the picture type determination unit 316 sets at least one of the P pictures after the IDR picture (the picture IDR9) as a conditional P picture. Thus, in the scene immediately after focus adjustment, a plurality of random access points including the IDR picture and the conditional P picture are set.

Figure 14:
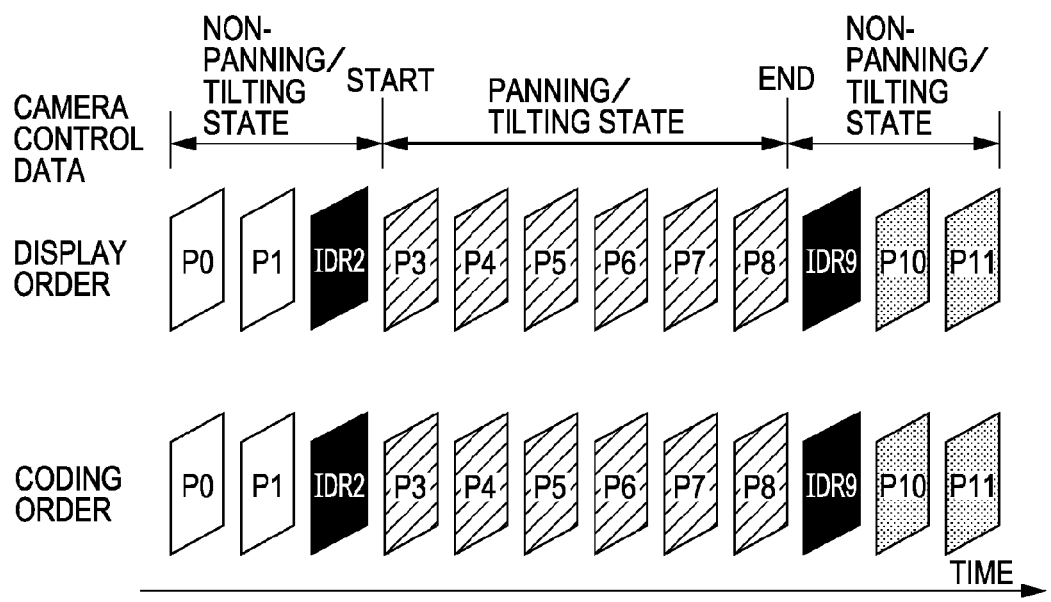
FIG. 14 is an illustration for explaining an exemplary method for setting a conditional P picture on which the motion reference relationship is restricted in accordance with panning/tilting detection data according to an aspect of the present invention.

In the case of panning/tilting, a conditional P picture is set in conjunction with an IDR picture (the picture IDR9) set immediately after panning/tilting, as shown in FIG. 14. In the example shown in FIG. 14, the pictures P10 and P11 are set as conditional P pictures. That is, the picture type determination unit 316 sets at least one of the pictures after the IDR picture (the picture IDR9) as a conditional P picture. Thus, in the scene immediately after panning or tilting, a plurality of random access points including the IDR picture and the conditional P picture are set.

Figure 15:
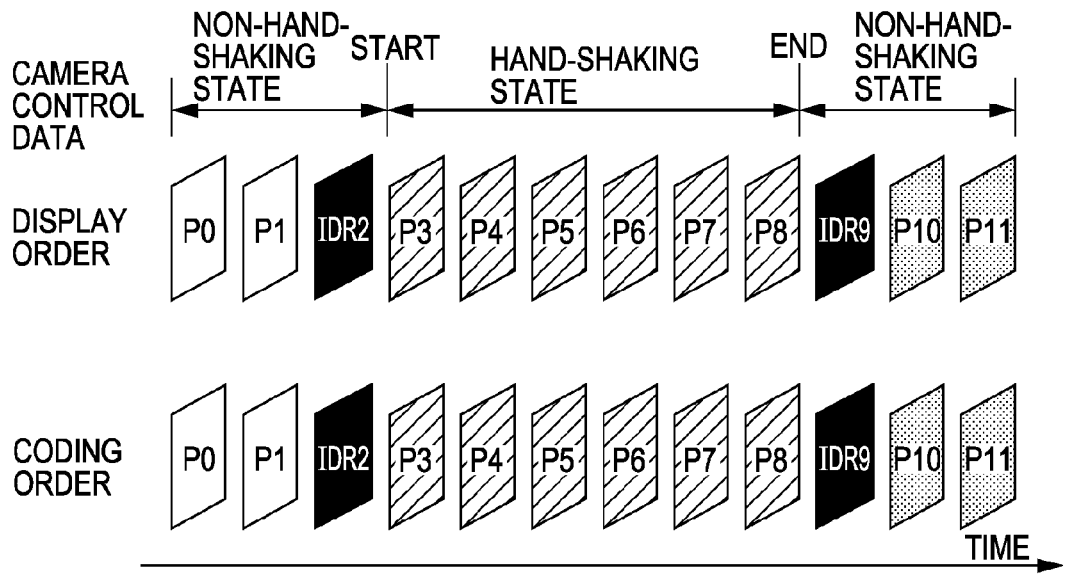
FIG. 15 is an illustration for explaining an exemplary method for setting a conditional P picture on which the motion reference relationship is restricted in accordance with hand shaking detection data according to an aspect of the present invention.

In the case of hand shaking, a conditional P picture is set in conjunction with an IDR picture (the picture IDR9) set immediately after hand shaking, as shown in FIG. 15. In the example shown in FIG. 15, the pictures P10 and P11 are set as conditional P pictures. That is, the picture type determination unit 316 sets at least one of the pictures after the IDR picture (the picture IDR9) as a conditional P picture. Thus, in the scene immediately after hand shaking, a plurality of random access points including the IDR picture and the conditional P picture are set.

Figure 16:
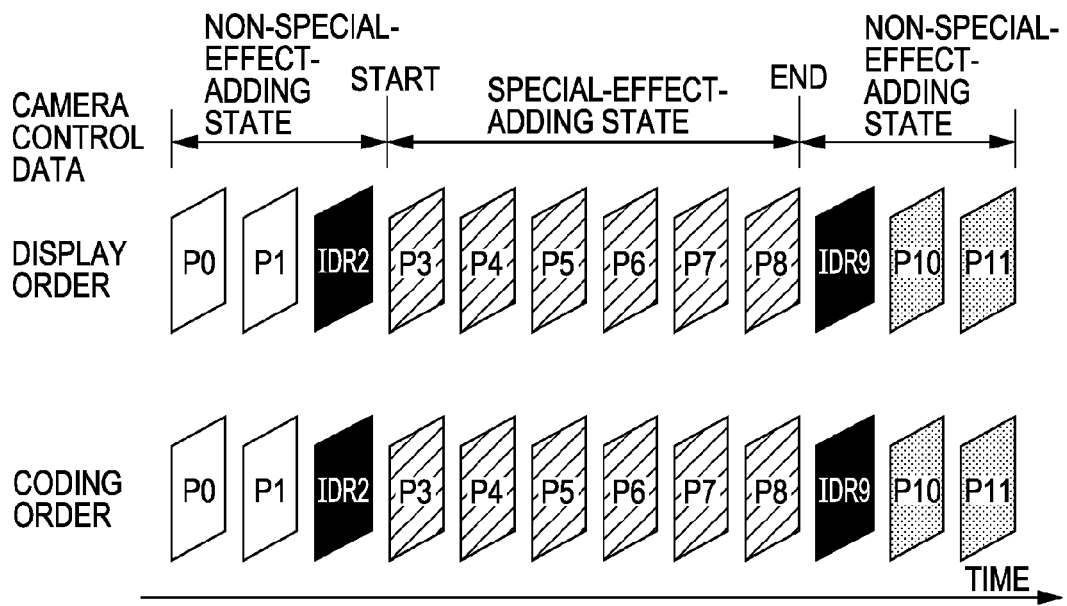
FIG. 16 is an illustration for explaining an exemplary method for setting a conditional P picture on which the motion reference relationship is restricted in accordance with special effect addition control data according to an aspect of the present invention.

In the case of special effects, a conditional P picture is set in conjunction with an IDR picture (the picture IDR9) set immediately after addition of special effects, as shown in FIG. 16. In the example shown in FIG. 16, the pictures P10 and P11 are set as conditional P pictures. That is, the picture type determination unit 316 sets at least one of the pictures after the IDR picture (the picture IDR9) as a conditional P picture. Thus, in the scene immediately after addition of special effects, a plurality of random access points including the IDR picture and the conditional P picture are set.

For example, in FIG. 12, at least one of not only the pictures after the IDR picture (the picture IDR9) set immediately after the completion of the zooming operation but also the pictures after an IDR picture (the picture IDR2) set immediately before the start of the zooming operation may be set as a conditional P picture. That is, at least one of the pictures P3 to P8 shown in FIG. 12 may be set as a conditional P picture. Thus, random access to an image in the process of zooming operation can be achieved.

Second Exemplary Embodiment

Figure 17:
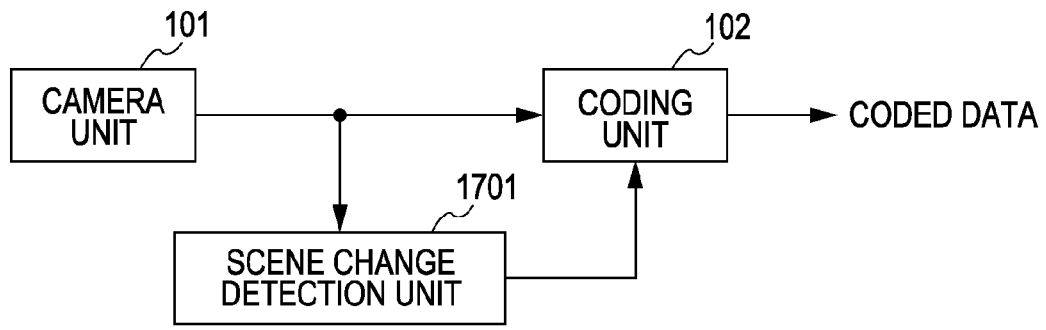
FIG. 17 is a block diagram showing an exemplary configuration of an image coding apparatus according to a second embodiment of the present invention.

A second embodiment of the present invention will now be described. FIG. 17 is a block diagram showing the configuration of an image coding apparatus according to the second embodiment. The image coding apparatus according to the second embodiment is capable of setting a conditional P picture in conjunction with an IDR picture set in response to a scene change. Since parts referred to with the same reference numerals as in the first embodiment perform similar operations and processing, the descriptions of those same parts will not be repeated here.

Figure 18:
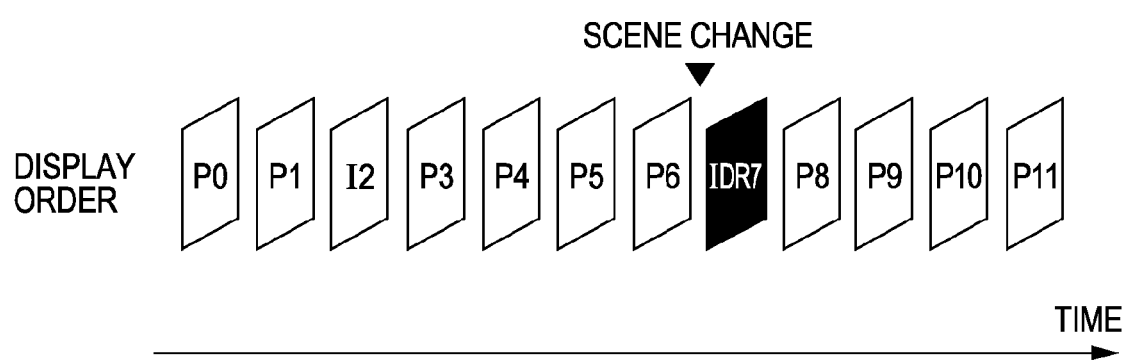
FIG. 18 is an illustration for explaining an exemplary method for setting an IDR picture according to the second embodiment.

A scene change detection unit 1701 detects a scene change, for example, when the difference in pixel values between frames of uncompressed image data output from the camera unit 101 is larger than a predetermined threshold value. When detecting a scene change, the scene change detection unit 1701 outputs IDR picture setting information. Then, the picture type determination unit 316 sets a picture type as an IDR picture. For example, when a scene change occurs immediately after the picture P6, as shown in FIG. 18, the picture type of the picture immediately after the picture P6 is set as an IDR picture.

Figure 19:
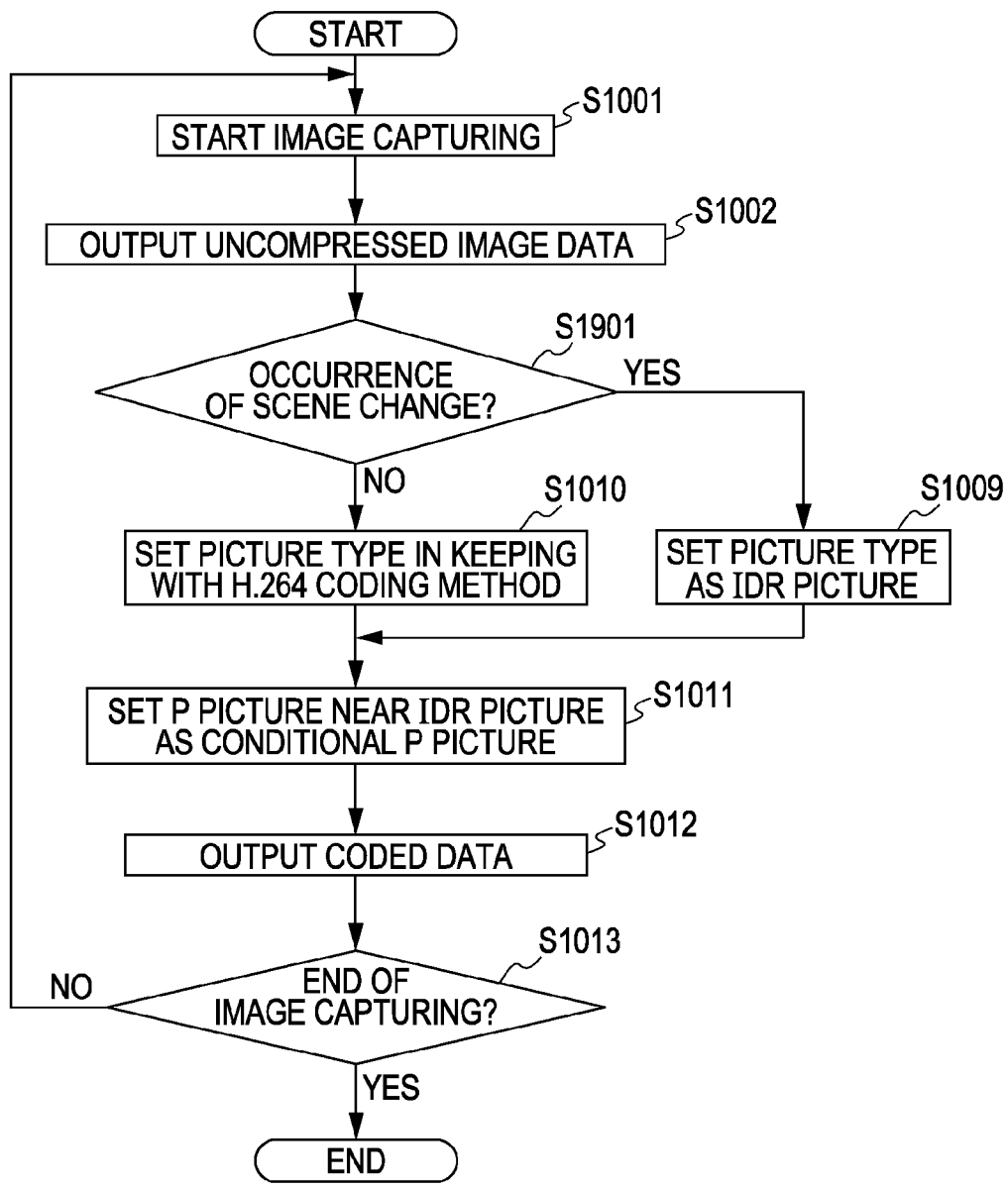
FIG. 19 is a flowchart of an exemplary coding process according to the second embodiment.

Coding processing performed when an IDR picture is set in accordance with the above-described scene change will be described with reference to FIGS. 17 and 19. FIG. 19 is a flowchart of an exemplary coding process according to the second embodiment.

Steps S1001 through S1002 are similar to the process shown in the flowchart from FIG. 10. Then, in step S1901, the scene change detection unit 1701 detects occurrence of a scene change in accordance with the pixel value difference between pictures of uncompressed image data output from the camera unit 101. If a scene change is detected in step S1901, the scene change detection unit 1701 outputs IDR picture setting information to the coding unit 102. Thus, in step S1009, the picture type determination unit 316 of the coding unit 102 sets a picture type as an IDR picture.

If a scene change is not detected in step S1901, the picture type determination unit 316 of the coding unit 102 sets a picture type in keeping with the H.264 coding method in step S1010. In accordance with the picture type set in step S1009 or S1010, the coding unit 102 performs coding processing using inter-prediction or intra-prediction. In step S1011, a picture proximate to the set IDR picture is set as a conditional P picture on which the reference relationship is restricted. In step S1012, coded data is output. Such a series of processing is repeated for each picture until the completion of image capturing in step S1013. Thus, all the input image data is coded.

Now a method for setting a conditional P picture in conjunction with an IDR picture set in response to a scene change, which is a feature of the second embodiment, will be described with reference to FIG. 20.

Figure 20:
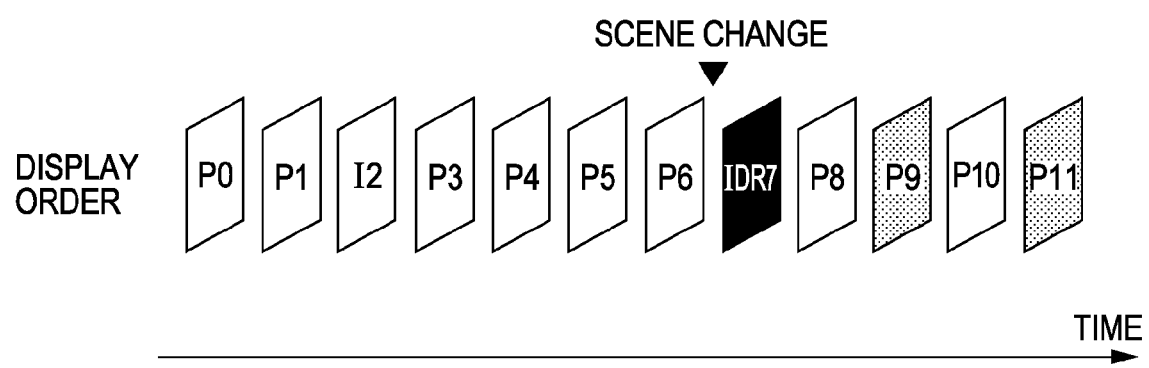
FIG. 20 is an illustration for explaining an exemplary method for setting a conditional P picture on which the motion reference relationship is restricted in accordance with the second embodiment.
Figure 21A:
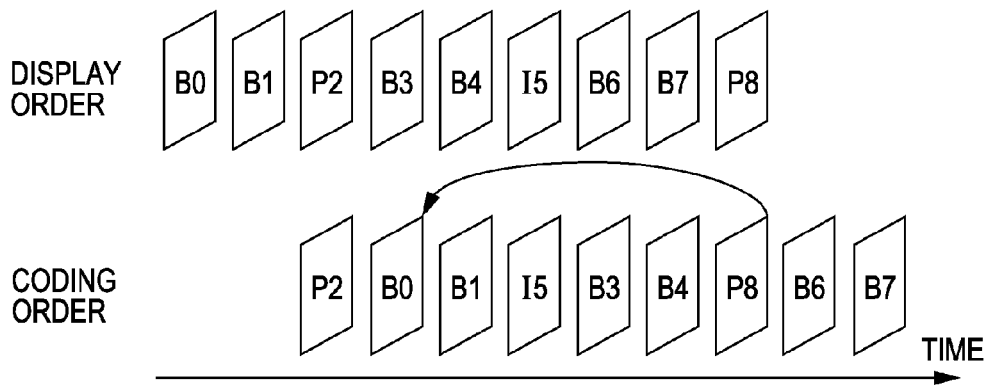
FIGS. 21A, 21B, and 21C are illustrations for explaining the conventional relationship of reference images.
Figure 21B:
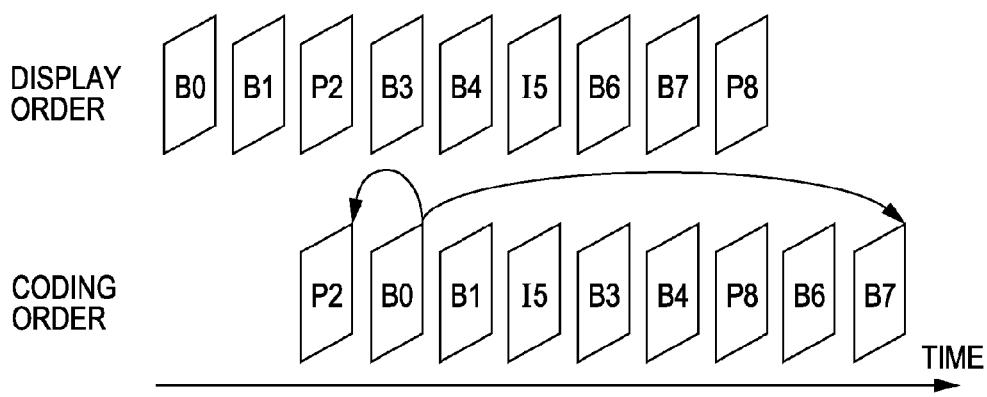
Figure 21C:
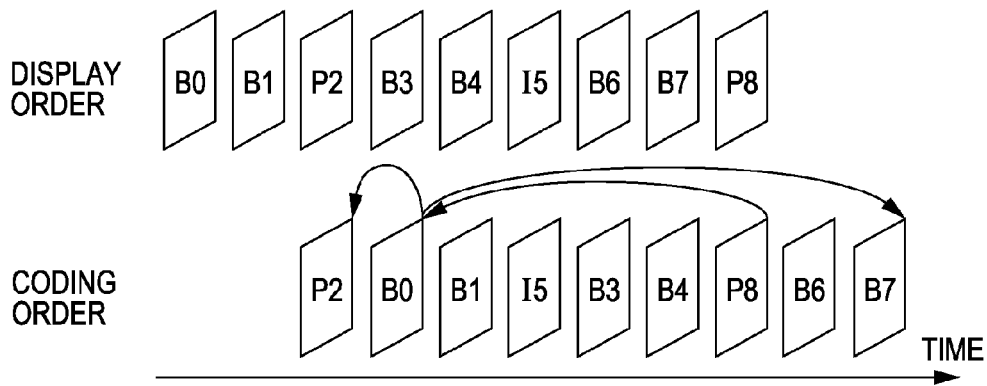
Figure 22A:
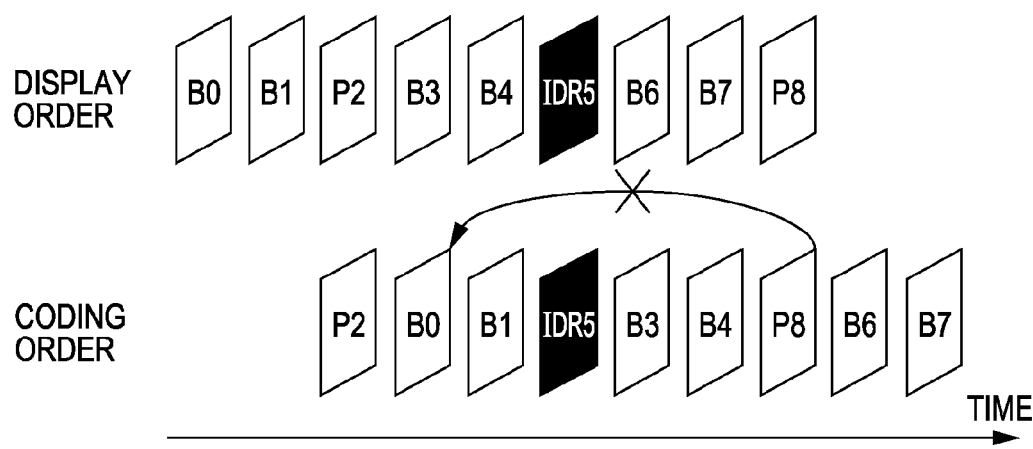
FIGS. 22A and 22B are illustrations for explaining a conventional IDR picture.
Figure 22B:
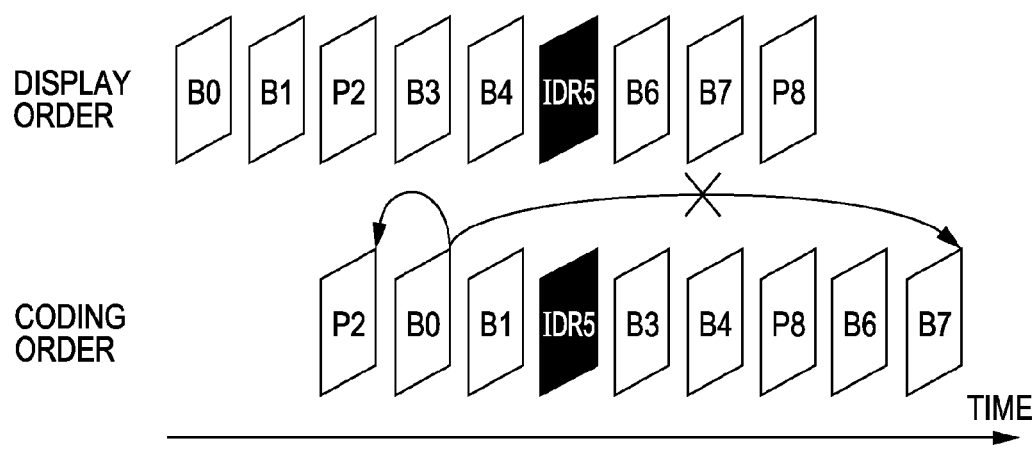

Referring to FIG. 20, the pictures P9 and P11 are conditional P pictures, and the other P pictures are normal P pictures. An image stream including I pictures and P pictures will be described below. However, even for an image stream including I pictures, P pictures, and B pictures, random access to a conditional P picture can be achieved by a similar method.

In the case of a scene change, since a significant change occurs between the images immediately before and after the scene change, photographers pay higher attention to the images immediately before and after the scene change. Since photographers desire random access to a portion of an image stream to which a higher attention is paid, it is desirable to provide many random access points in the portion of the image stream to which the higher attention is paid.

Thus, at least one of the pictures immediately after an IDR picture set in response to a scene change is set as a conditional P picture in order to add a random access point. That is, when the scene change detection unit 1701 detects a scene change, the picture type determination unit 316 first sets a picture type as an IDR picture. Then, the picture type determination unit 316 sets at least one of the pictures after the set IDR picture as a conditional P picture.

In the example shown in FIG. 20, the scene change detection unit 1701 detects a scene change immediately after the picture P6. Since the scene change is detected immediately after the picture P6, the picture type of the picture immediately after the picture P6 is set as an IDR picture (the picture IDR7), as described above. In the second embodiment, at least one of the pictures after the IDR picture (the picture IDR7) is set as a conditional P picture in conjunction with the IDR picture (the picture IDR7). In the example shown in FIG. 20, the pictures P9 and P11 are set as conditional P pictures, and the pictures P8 and P10 are set as normal P pictures. Thus, random access to the pictures IDR7, P9, or P11 can be achieved.

Seek playback, such as fast-forward or reverse playback, requires more rapid decoding processing compared with uniform playback. As described above, a conditional P picture can be decoded quickly only by decoding at least one picture having a reference relationship with respect to a conditional P picture in advance. Thus, in addition to an I picture and an IDR picture on which intra-picture coding is performed, a conditional P picture can be used as an image displayed when seek playback is performed.

In the methods according to the first and second embodiments of the present invention, a conditional P picture set in conjunction with an IDR picture is set in a portion of an image stream to which a higher attention is paid. Thus, the portion to which the higher attention is paid includes more images that can be displayed when seek playback is performed, compared with the other portions of the image stream.

For example, in the example shown in FIG. 20, in a portion of the image stream to which high attention is not paid before the scene change, only one picture, the picture I2, can be displayed when seek playback is performed. In contrast, in a portion of the image stream to which a higher attention is paid immediately after the scene change, three pictures, the pictures IDR7, P9, and P11, can be displayed when seek playback is performed. Thus, seek playback of the portion of the image stream to which a higher attention is paid can be performed at a lower speed, compared with a case of seek playback of the portion of the image stream to which high attention is not paid. Thus, in the portion of the image stream to which the higher attention is paid, photographers are able to determine the details of an image more easily.

According to the foregoing embodiments, in accordance with camera control data or a scene change, the picture type of a minimum number of pictures is set as an IDR picture, and a conditional P picture that enables random access is set in conjunction with the IDR picture. Thus, many random access points can be set in a portion of an image stream to which a higher attention is paid. Therefore, compared with a known case where an IDR picture is regularly set, an image stream that enables random access to a conditional P picture can be acquired without reducing coding efficiency.

In addition, although an example in which an IDR picture is set in accordance with camera control data has been explained in the first embodiment and an example in which an IDR picture is set in response to a scene change has been explained in the second embodiment, the present invention is also applicable to a configuration in which an IDR picture is appropriately set in accordance with a coding state. The coding processing performed in this case will be described with reference to FIG. 23. FIG. 23 shows an example in which P pictures before and after an IDR picture are set as conditional P pictures.

If a point in time at which an IDR picture is set is known in advance, conditional P pictures can be set immediately before and after the IDR picture. A case where a point in time at which an IDR picture is set is known in advance is, for example, a case where the picture type determination unit 316 actively sets an IDR picture at a point in time determined by the picture type determination unit 316 itself in accordance with a coding state or a case where the picture type determination unit 316 performs so-called 2-pass coding. In such cases, the coding unit 102 is capable of performing coding in which, in conjunction with setting of an IDR picture by the picture type determination unit 316, at least one of the P pictures located before and after the IDR picture is set as a conditional P picture.

In the example shown in FIG. 23, coding is performed such that the picture P5, which is the P picture immediately before the IDR picture (the picture IDR8), and the picture P11, which is the P picture immediately after the IDR picture (the picture IDR8), are set as conditional P pictures. In the example shown in FIG. 23, under restrictions (1) and (2) described above, coding in which a reference relationship is restricted is performed in a GOP including the picture P5 and in a GOP including the picture P11. With this configuration, a plurality of random access points including an IDR picture and conditional P pictures disposed proximate to the IDR picture can be set.

In addition, an aspect of the present invention may be achieved by supplying a storage medium on which program code of software for realizing the functions of the foregoing embodiments is stored to a system or an apparatus and by reading and executing the program code stored in the storage medium by a computer of the system or the like.

In this case, the program code itself read from the storage medium attains the functions of the foregoing embodiments, and the storage medium storing the program code constitutes the present invention.

The storage medium for supplying the program code may be, for example, a flexible disc, a hard disk, an optical disc, a magneto-optical disc, a compact disc read-only memory (CD-ROM), a CD-recordable (CD-R), a magnetic tape, a nonvolatile memory card, a ROM, or the like.

In addition, the functions of the foregoing embodiments can also be attained by performing part or all of the actual processing by an operating system (OS) or the like running on the computer on the basis of instructions of the program code read by the computer.

Furthermore, the functions of the foregoing embodiments can also be attained by performing the actual processing by a central processing unit (CPU) or the like on the basis of instructions of the program code read from the storage medium after the program code is written in a memory of a function expansion unit or the like connected to the computer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-351053 filed Dec. 5, 2005, which is hereby incorporated by reference herein in its entirety.

What is claimed:

1. An image coding apparatus configured to compress and code image data, the apparatus comprising:
a coding unit configured to set, when coding processing is performed on input image data, a first coding picture to inhibit reference of an inter-picture prediction beyond the first coding picture itself that is to be generated by intra-picture prediction coding, and set, when coding processing is performed on the input image data, a second coding picture to inhibit reference of the inter-picture prediction beyond the second coding picture itself that is to be generated by inter-picture prediction coding,
wherein the coding unit sets the first coding picture according to a predetermined condition, and sets at least one second coding picture in conjunction with the setting of the first coding picture.

2. The image coding apparatus according to claim 1,
wherein the first coding picture is an instantaneous decoder refresh picture, and
wherein the second coding picture is a conditional P picture on which a reference relationship is restricted such that the reference relationship can be established only with a picture located within the same group of pictures.

3. The image coding apparatus according to claim 1,
wherein the coding unit is configured to set a third coding picture that is to be generated by inter-picture prediction coding, and skip reference beyond the third coding picture being permitted, and
wherein instead of at least one third coding picture, the second coding picture is set proximate to the first coding picture.

4. The image coding apparatus according to claim 3,
wherein the first coding picture is an instantaneous decoder refresh picture,
wherein the second coding picture is a conditional P picture on which a reference relationship is restricted such that the reference relationship can be established only with a picture located within the same group of pictures, and
wherein the third coding picture is a normal P picture.

5. The image coding apparatus according to claim 1, wherein the coding unit generates an image stream in which random access to the position of the set first coding picture or the position of the set second coding picture is achieved.

6. The image coding apparatus according to claim 1, wherein the coding unit sets at least one of the pictures after the first coding picture as the second coding picture.

7. The image coding apparatus according to claim 1, further comprising a determination unit configured to acquire control data of a camera capturing an image of a subject and to determine whether or not an operation of the camera satisfies a setting condition of the first coding picture in accordance with the control data,
wherein the coding unit sets a picture as the first coding picture in accordance with a determination result of the determination unit and sets the second coding picture in conjunction with the setting of the first coding picture.

8. The image coding apparatus according to claim 7,
wherein the determination unit determines whether or not the setting condition of the first coding picture is satisfied by detecting a change of an operation state of the camera represented by the control data, and
wherein the coding unit sets some of pictures after the operation state of the camera changes as the first coding picture and the second coding picture.

9. The image coding apparatus according to claim 8, wherein the control data includes at least one of focus adjustment control data, zooming operation control data, oscillation detection data regarding detection of oscillation of the camera, movement detection data regarding detection of movement of the camera, and special effect addition control data regarding addition of special effects to the image.

10. The image coding apparatus according to claim 1, further comprising a determination unit configured to detect a correlation between a plurality of pictures included in the input image data and to determine whether or not the correlation satisfies a setting condition of the first coding picture,
wherein the coding unit sets a picture as the first coding picture in accordance with a determination result of the determination unit and sets the second coding picture in conjunction with the setting of the first coding picture.

11. The image coding apparatus according to claim 10,
wherein the determination unit determines whether or not the setting condition of the first coding picture is satisfied by detecting a scene change in the input image data, and
wherein the coding unit sets some of pictures after the scene change as the first coding picture and the second coding picture.

12. The image coding apparatus according to claim 1, wherein the coding unit sets at least one second coding picture immediately before or after the first coding picture.

13. An image coding method for compressing and coding image data, the method comprising the steps of:
a coding step of setting, when coding processing is performed on input image data, a first coding picture to inhibit reference of an inter-picture prediction beyond the first coding picture itself that is to be generated by intra-picture prediction coding, and setting, when coding processing is performed on the input image data, a second coding picture to inhibit reference of the inter-picture prediction beyond the second coding picture itself that is to be generated by inter-picture prediction coding,
wherein, in the coding step, the first coding picture is set according to a predetermined condition, and at least one second coding picture is set in conjunction with the setting of the first coding picture.

14. The image coding method according to claim 13,
wherein the first coding picture is an instantaneous decoder refresh picture, and
wherein the second coding picture is a conditional P picture on which a reference relationship is restricted such that the reference relationship can be established only with a picture located within the same group of pictures.

15. The image coding method according to claim 13,
wherein, in the coding step, a third coding picture that is to be generated by inter-picture prediction coding, skip reference beyond the third coding picture being permitted, is set, and
wherein instead of at least one third coding picture, the second coding picture is set proximate to the first coding picture.

16. The image coding method according to claim 15,
wherein the first coding picture is an instantaneous decoder refresh picture,
wherein the second coding picture is a conditional P picture on which a reference relationship is restricted such that the reference relationship can be established only with a picture located within the same group of pictures, and wherein the third coding picture is a normal P picture.

17. The image coding method according to claim 13, wherein, in the coding step, an image stream in which random access to the position of the set first coding picture or the position of the set second coding picture is achieved is generated.

18. The image coding method according to claim 13, wherein, in the coding step, at least one of the pictures after the first coding picture is set as the second coding picture.

19. The image coding method according to claim 13, further comprising a determination step of acquiring control data of a camera that captures an image of a subject and determining whether or not an operation of the camera satisfies a setting condition of the first coding picture in accordance with the control data, wherein, in the coding step, a picture is set as the first coding picture in accordance with a determination result acquired by the determination step, and setting of the second coding picture is performed in conjunction with the setting of the first coding picture.

20. The image coding method according to claim 19, wherein, in the determination step, it is determined whether or not the setting condition of the first coding picture is satisfied by detecting a change of an operation state of the camera represented by the control data, and wherein, in the coding step, some of pictures after the operation state of the camera changes are set as the first coding picture and the second coding picture.

21. The image coding method according to claim 20, wherein the control data includes at least one of focus adjustment control data, zooming operation control data, oscillation detection data regarding detection of oscillation of the camera, movement detection data regarding detection of movement of the camera, and special effect addition control data regarding addition of special effects to the image.

22. The image coding method according to claim 13, further comprising a determination step of detecting a correlation between a plurality of pictures included in the input image data and determining whether or not the correlation satisfies a setting condition of the first coding picture, wherein, in the coding step, a picture is set as the first coding picture in accordance with a determination result acquired by the determination step, and setting of the second coding picture is performed in conjunction with the setting of the first coding picture.

23. The image coding method according to claim 22, wherein, in the determination step, it is determined whether or not the setting condition of the first coding picture is satisfied by detecting a scene change in the input image data, and wherein, in the coding step, some of pictures after the scene change are set as the first coding picture and the second coding picture.

24. The image coding apparatus according to claim 13, wherein, in the coding step, at least one second coding picture is set immediately before or after the first coding picture.

25. A non-transitory computer readable medium containing computer-executable instructions for compressing and coding image data, the computer readable medium comprising:

computer-executable instructions for performing a coding step of setting, when coding processing is performed on input image data, a first coding picture to inhibit reference of an inter-picture prediction beyond the first coding picture itself that is to be generated by intra-picture prediction coding, and setting, when coding processing is performed on the input image data, a second coding picture to inhibit reference of the inter-picture prediction beyond the second coding picture itself that is to be generated by inter-picture prediction coding, wherein, in the coding step, the first coding picture is set according to a predetermined condition, and at least one second coding picture is set in conjunction with the setting of the first coding picture.

26. The computer readable medium according to claim 25, wherein the first coding picture is an instantaneous decoder refresh picture, and wherein the second coding picture is a conditional P picture on which a reference relationship is restricted such that the reference relationship can be established only with a picture located within the same group of pictures.

27. The computer readable medium according to claim 25, wherein, in the coding step, a third coding picture that is to be generated by inter-picture prediction coding, skip reference beyond the third coding picture being permitted, is set, and wherein instead of at least one third coding picture, the second coding picture is set proximate to the first coding picture.

28. The computer readable medium according to claim 27, wherein the first coding picture is an instantaneous decoder refresh picture, wherein the second coding picture is a conditional P picture on which a reference relationship is restricted such that the reference relationship can be established only with a picture located within the same group of pictures, and wherein the third coding picture is a normal P picture.

29. The computer readable medium according to claim 25, wherein, in the coding step, an image stream in which random access to the position of the set first coding picture or the position of the set second coding picture is achieved is generated.

30. The computer readable medium according to claim 25, wherein, in the coding step, at least one of the pictures after the first coding picture is set as the second coding picture.

31. The computer readable medium according to claim 25, further comprising computer-executable instructions for performing a determination step of acquiring control data of a camera that captures an image of a subject and determining whether or not an operation of the camera satisfies a setting condition of the first coding picture in accordance with the control data, wherein, in the coding step, a picture is set as the first coding picture in accordance with a determination result acquired by the determination step, and setting of the second coding picture is performed in conjunction with the setting of the first coding picture.

32. The computer readable medium according to claim 31, wherein, in the determination step, it is determined whether or not the setting condition of the first coding picture is satisfied by detecting a change of an operation state of the camera represented by the control data, and wherein, in the coding step, some of pictures after the operation state of the camera changes are set as the first coding picture and the second coding picture.

33. The computer readable medium according to claim 32, wherein the control data includes at least one of focus adjustment control data, zooming operation control data, oscillation detection data regarding detection of oscillation of the camera, movement detection data regarding detection of movement of the camera, and special effect addition control data regarding addition of special effects to the image.

34. The computer readable medium according to claim 25, further comprising computer-executable instructions for performing a determination step of detecting a correlation between a plurality of pictures included in the input image data and determining whether or not the correlation satisfies a setting condition of the first coding picture, wherein, in the coding step, a picture is set as the first coding picture in accordance with a determination result acquired by the determination step, and setting of the second coding picture is performed in conjunction with the setting of the first coding picture.

35. The computer readable medium according to claim 34, wherein, in the determination step, it is determined whether or not the setting condition of the first coding picture is satisfied by detecting a scene change in the input image data, and wherein, in the coding step, some of pictures after the scene change are set as the first coding picture and the second coding picture.

* * * * *